United States Patent
Shimizu (10) Patent No.: US 11,055,413 B2
(45) Date of Patent: Jul. 6, 2021

(54) INFORMATION PROCESSING APPARATUS, METHOD, AND STORAGE MEDIUM TO SEQUENTIALLY ACTIVATE A PLURALITY OF MODULES AFTER ACTIVATION OF A BOOT PROGRAM

(71) Applicant: CANON KABUSHIKI KAISHA, Tokyo (JP)

(72) Inventor: Shota Shimizu, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 333 days.

(21) Appl. No.: 16/155,950

(22) Filed: Oct. 10, 2018

(65) Prior Publication Data
US 2019/0114429 A1 Apr. 18, 2019

(30) Foreign Application Priority Data
Oct. 18, 2017 (JP) .............................. JP2017-201956

(51) Int. Cl.
*G06F 21/57* (2013.01)
*H04L 9/32* (2006.01)

(52) U.S. Cl.
CPC .......... *G06F 21/572* (2013.01); *G06F 21/575* (2013.01); *H04L 9/3247* (2013.01)

(58) Field of Classification Search
CPC ..... G06F 21/572; G06F 21/575; H04L 9/3247
See application file for complete search history.

(56) References Cited

U.S. PATENT DOCUMENTS

| | | | |
|---|---|---|---|
| 2006/0161784 A1 | 7/2006 | Hunter et al. | |
| 2007/0136807 A1 | 6/2007 | DeLiberato et al. | |
| 2008/0120610 A1* | 5/2008 | Katano | G06F 21/572 717/168 |
| 2009/0271637 A1* | 10/2009 | Takekawa | G06F 21/6245 713/189 |
| 2009/0279693 A1 | 11/2009 | Billet et al. | |
| 2010/0142839 A1* | 6/2010 | Lakus-Becker | H04N 19/12 382/244 |
| 2011/0161551 A1* | 6/2011 | Khosravi | G06F 21/80 711/103 |
| 2012/0290884 A1* | 11/2012 | Hamaguchi | G06F 1/00 714/49 |

(Continued)

FOREIGN PATENT DOCUMENTS

RU 2595924 C2 8/2016
WO 2012148422 A1 11/2012

OTHER PUBLICATIONS

NPL Search (Google Scholar) (Year: 2021).*

(Continued)

*Primary Examiner* — John B King
*Assistant Examiner* — Richard W Cruz-Franqui
(74) *Attorney, Agent, or Firm* — Venable LLP (57) ABSTRACT

The present information processing apparatus sequentially activates a plurality of modules after the activation of a boot program. Each module uses verification information for verifying a signature of the module to be activated next to detect alteration of the module that is next to be activated, and activates the module to be activated next in a case where verification of the signature succeeds. Furthermore, each module holds in advance the verification information and its own signature.

9 Claims, 11 Drawing Sheets

(56) References Cited

U.S. PATENT DOCUMENTS

| | | | |
|---|---|---|---|
| 2013/0141762 A1* | 6/2013 | Ishikawa | H04N 1/21 358/1.16 |
| 2014/0040636 A1* | 2/2014 | Jeansonne | G06F 21/602 713/189 |
| 2014/0068276 A1* | 3/2014 | Imamoto | G06F 21/6209 713/192 |
| 2014/0074653 A1* | 3/2014 | Wang | G06Q 30/0631 705/26.7 |
| 2014/0082373 A1* | 3/2014 | Colnot | G06F 21/572 713/193 |
| 2015/0235028 A1* | 8/2015 | Tsuchitoi | G06F 21/572 713/187 |
| 2016/0004542 A1* | 1/2016 | Das | G06F 9/4405 713/2 |
| 2016/0179449 A1* | 6/2016 | Cho | G06F 3/1275 358/1.15 |
| 2016/0196130 A1* | 7/2016 | Shimizu | G06F 8/65 717/168 |
| 2016/0234396 A1* | 8/2016 | Yasukawa | B41J 29/38 |
| 2017/0103209 A1* | 4/2017 | Wooten | H04L 9/0866 |
| 2017/0230422 A1 | 8/2017 | Shimizu | |
| 2019/0114429 A1* | 4/2019 | Shimizu | G06F 21/575 |

OTHER PUBLICATIONS

"About TPM", Insight International Inc., http://www.insight-intl.com/jigyou/securitysystem/about_TPM/about_TPM20.html retrieved Jul. 17, 2018.

"2. Importance of Roots of Trust", Insight International Inc., http://www.insight-intl.com/jigyou/securitysystem/about_TPM/about_TPM20_2.html retrieved Jul. 17, 2018.

"Secure Boot Process for Wireless Sensor Node", L.H. Adnan, et al., Centre of Computer Engineering Studies, Faculty of Electrical Engineering, University Teknologi MARA, Shah Alam, Malaysia, 2010 International Conference on Computer Applications and Industrial Electronics (ICCAIE 2010), Dec. 5-7, 2010.

European Search Report issued in corresponding European Application No. 18197321.5 dated Feb. 13, 2019.

Russian Office Action issued in corresponding Russian Application No. 2018136581 dated Oct. 31, 2019.

* cited by examiner

INFORMATION PROCESSING APPARATUS, METHOD, AND STORAGE MEDIUM TO SEQUENTIALLY ACTIVATE A PLURALITY OF MODULES AFTER ACTIVATION OF A BOOT PROGRAM

BACKGROUND OF THE INVENTION

Field of the Invention

The present invention relates to an information processing apparatus, a method for controlling the same, and a storage medium.

Description of the Related Art

Regarding vulnerabilities of software in a computer system, attacks that alter software and exploit computers are a problem. As a countermeasure for such attacks, non-patent document ("About TPM", [online], [search on Oct. 12, 2017], Insight International Inc., Internet: <http://www.insight-intl.com/jigyou/securitysystem/about_TPM/about_TPM20.html>) proposes a TPM (Trusted Platform Module) that aims to strengthen security in a computing environment in a computer system (platform), for a TCG (Trusted Computing Group). In a TPM, hash values for the BIOS/UEFI, and boot loader are successively obtained from a CRTM (Core Root of Trust for Measurement) at times when they are activated, and these are activated while extending PCRs of the TPM one after another. Furthermore, in the TPM, alteration detection is performed by, after the completion of activation, determining whether PCR values in the TPM and correct answer values match. Such secure activation is referred to as Trusted Boot (Secure Boot). Note that because CRTM or TPM are configurations that cannot be rewritten, an attack that alters a portion for executing alteration detection processing in order to avoid it is theoretically impossible.

However, there is a problem as is recited below in the foregoing conventional technique. For example, with a configuration that does not have a TPM, such as a low-cost device, it is not possible to realize Trusted Boot. In the case of such a configuration, verification processing for an alteration is executed after activation of an application for executing this processing completes. Consequently, even if an alteration has been performed, it is not possible to immediately detect the alteration, and because the alteration is detected after the BIOS or OS has operated to a certain degree, that gives room for an application which is altered with malice intent, for example, to run.

SUMMARY OF THE INVENTION

The present invention enables realization of a mechanism for detecting an alteration of a system at a time of activation, even with a configuration that does not have a TPM.

One aspect of the present invention provides an information processing apparatus operable to sequentially activate a plurality of modules after activation of a boot program by an embedded controller, each module comprises: a detection unit that uses verification information for verifying a signature of a module to be activated next to detect alteration of the module to be activated next, and an activation unit that activates the module to be activated next in a case where verification of the signature by the detection unit succeeds, and wherein each module holds in advance the verification information and its own signature.

Another aspect of the present invention provides a method of controlling an information processing apparatus operable to sequentially activate a plurality of modules after activation of a boot program by an embedded controller, wherein each module includes: using verification information for verifying a signature of a module to be activated next to detect alteration of the module to be activated next, and activating the module to be activated next when verification of the signature succeeds.

Still another aspect of the present invention provides a non-transitory computer-readable storage medium storing a computer program for causing a computer to execute each step of a method of controlling an information processing apparatus operable to sequentially activate a plurality of modules after activation of a boot program by an embedded controller, wherein each module includes: using verification information for verifying a signature of a module to be activated next to detect alteration of the module to be activated next, and activating the module to be activated next when verification of the signature succeeds.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Description is given below regarding a first embodiment of the present invention, with reference to the attached drawings. Note that the following embodiments are not intended to limit the scope of the claims of the present invention, and that not all of the combinations of the features that are described according to the following embodiments are necessarily required with respect to the means to solve the problems according to the present invention. In addition, description is given by taking a multi function peripheral (a digital multi function peripheral/MFP) as an example of an information processing apparatus according to the embodiment. However, the scope of application is not limited to multi function peripherals, and application may be to any information processing apparatus.

<Hardware Configuration of Information Processing Apparatus>

Figure 1:
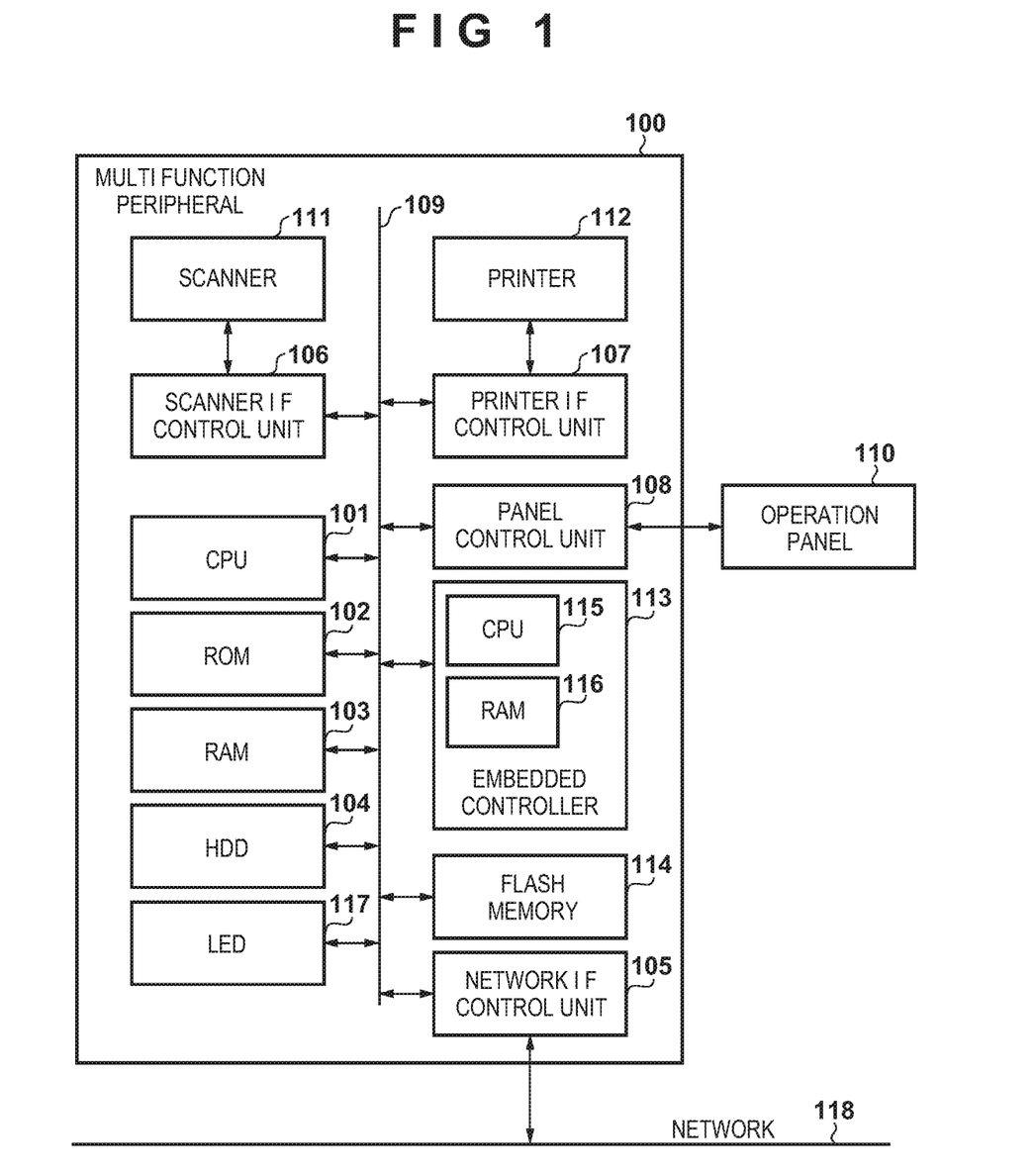
FIG. 1 is a hardware configuration diagram of a multi function peripheral according to an embodiment.

Firstly, with reference to FIG. 1, description is given for a hardware configuration of a multi function peripheral 100, which is an information processing apparatus according to the present embodiment, and an embedded controller 113. The multi function peripheral 100 is provided with a CPU 101, a ROM (Read-Only Memory) 102, a RAM (Random Access Memory) 103, an HDD (Hard Disk Drive) 104, a network I/F control unit 105, a scanner I/F control unit 106, a printer I/F control unit 107, a panel control unit 108, a scanner 111, a printer 112, the embedded controller 113, a flash memory 114, and an LED 117. In addition, the embedded controller 113 is provided with a CPU 115 and a RAM 116.

The CPU 101 executes a software program of the multi function peripheral 100 to comprehensively control the apparatus as a whole. The ROM 102 is a read-only memory, and stores a BIOS (Basic Input/Output System) of the multi function peripheral 100, fixed parameters, or the like. The RAM 103 is a random-access memory, and is used to, for example, store a program or temporary data when the CPU 101 controls the multi function peripheral 100. The HDD 104 is a hard disk drive, and stores some applications and various pieces of data. The flash memory 114 stores various modules such as a loader, a kernel, and applications.

The CPU 115 of the embedded controller 113 executes a software program of the embedded controller 113 to perform some control in the multi function peripheral 100. The RAM 116 is a random-access memory, and is used to, for example, store a program or temporary data when the CPU 115 controls the multi function peripheral 100. With respect to the embedded controller 113, the multi function peripheral 100 is provided with a main controller for comprehensively controlling the system. The main controller is configured by including at least the CPU 101, the ROM 102, and the RAM 103.

The network I/F control unit 105 controls transmission and reception of data with a network 118. The scanner I/F control unit 106 performs control for reading an original by the scanner 111. The printer I/F control unit 107 controls print processing or the like by the printer 112. The panel control unit 108 controls an operation panel 110 which is a touch panel, displays various pieces of information, and controls an instruction input from a user. A bus 109 connects the CPU 101, the ROM 102, the RAM 103, the HDD 104, the network I/F control unit 105, the scanner I/F control unit 106, and the printer I/F control unit 107 to each other. Furthermore, the bus 109 also connects the panel control unit 108, the embedded controller 113, and the flash memory 114 to each other. A control signal from the CPU 101 or data signals between apparatuses are transmitted and received via the bus 109. The LED 117 lights as necessary, and is used to externally convey an abnormality in software or hardware.

<Software Configuration of Information Processing Apparatus>

Figure 2A:
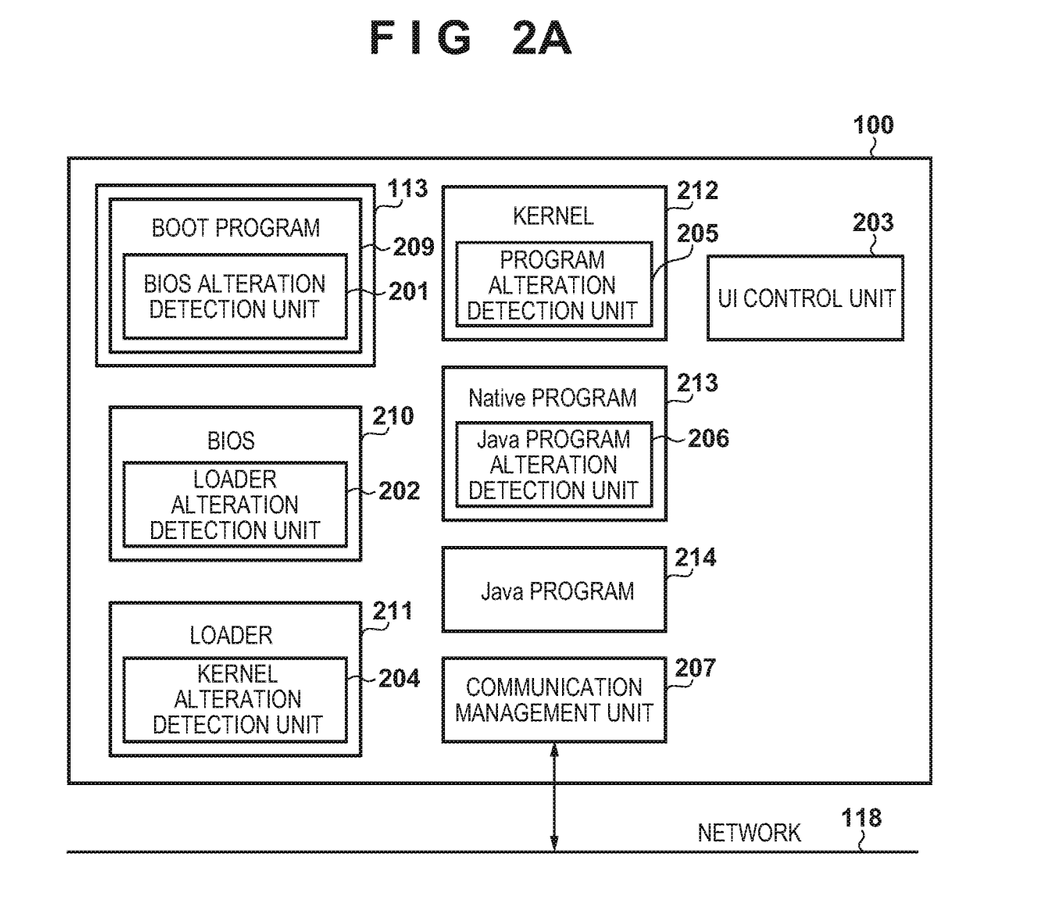
FIG. 2A and FIG. 2B are software configuration diagrams of the multi function peripheral according to the embodiment.

Next, with reference to FIG. 2A, description is given for software modules held by the multi function peripheral 100 according to the present embodiment. The multi function peripheral 100 includes a boot program 209 inside the embedded controller 113, as a software module. Furthermore, the multi function peripheral 100 includes a BIOS 210, a loader 211, a kernel 212, native programs 213, a Java® program 214 (Java® being a high-level programming language), a UI control unit 203, and a communication management unit 207.

The communication management unit 207 controls the network I/F control unit 105, which is connected to the network 118, which performs transmission and reception of data with an external unit via the network 118. The UI control unit 203 receives input to the operation panel 110 via the panel control unit 108, and performs processing in accordance with the input, or screen output to the operation panel 110.

The boot program 209 is a program that is executed by the CPU 115 of the embedded controller 113 when the power source of the multi function peripheral 100 is turned on, and, in addition to executing processing related to activation, includes a BIOS alteration detection unit 201 for detecting alteration of the BIOS. The BIOS 210 is a program that is executed by the CPU 101 after the execution of the boot program 209, and, in addition to executing processing relating to activation, includes a loader alteration detection unit 202 for detecting alteration of the loader 211.

The loader 211 is a program executed by the CPU 101 after processing for the BIOS 210 completes, and, in addition to executing processing relating to activation, has a kernel alteration detection unit 204 for detecting alteration of the kernel. The kernel 212 is a program executed by the CPU 101 after processing for the loader 211 completes, and, in addition to executing processing relating to activation, has a native alteration detection unit 205 for detecting alteration of the native programs 213.

The native programs 213 are programs that are executed by the CPU 101, and comprise a plurality of programs for providing various functions in cooperation with the Java® program 214 of the multi function peripheral 100. For example, the native programs 213 include a boot program or a program for controlling the scanner I/F control unit 106 or the printer I/F control unit 107. A boot program is called from the native programs by the kernel 212, and activation processing is executed. In addition, the native programs 213 have a Java® program alteration detection unit for detecting alteration of a Java® program as one of these programs.

The Java® program 214 is a program that is executed by the CPU 101, and is a program that provides various functions in cooperation with the native programs 213 of the multi function peripheral 100. For example, the Java® program 214 is a program for displaying a screen on the operation panel 110.

<Activation Procedure>

Figure 3A:
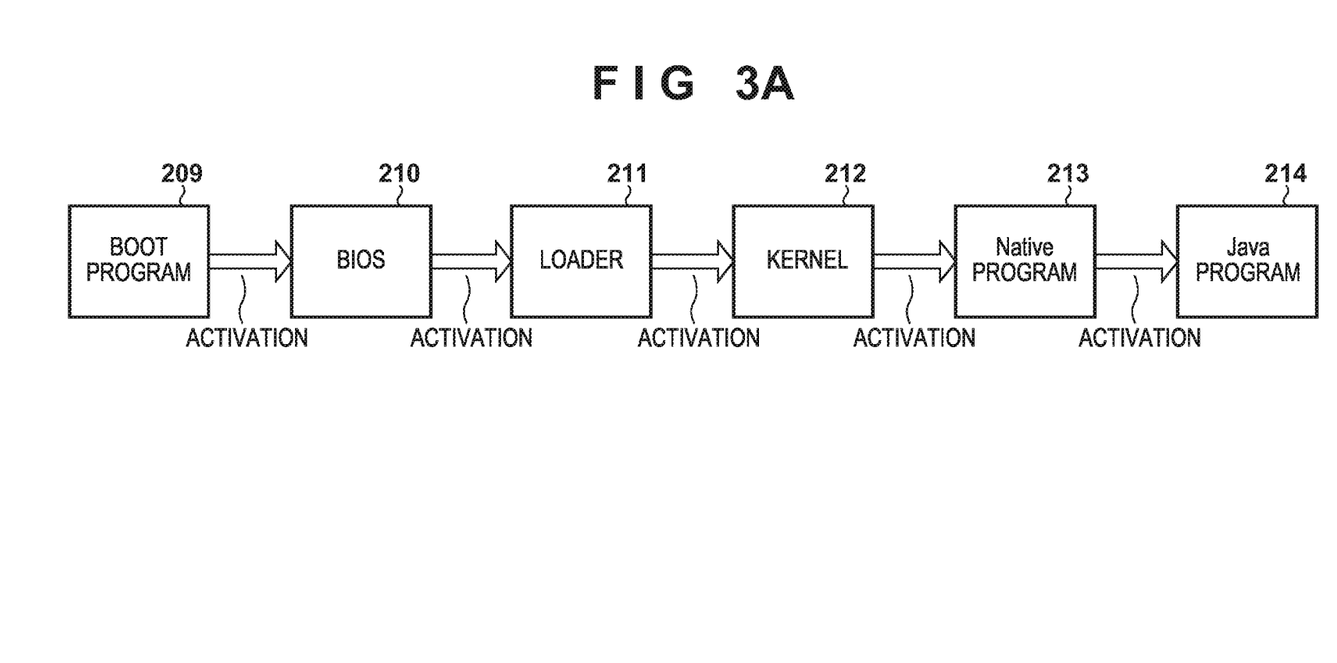
FIGS. 3A through 3E are pattern diagrams which illustrate operations at a time of activation, according to the embodiment.

Description is given below regarding a procedure for activating the multi function peripheral 100, with reference to FIG. 3A and FIG. 3B. FIG. 3A illustrates an order in which the multi function peripheral 100 is activated, without performing alteration detection. The boot program 209 activates the BIOS 210, the BIOS 210 activates the loader 211, the loader 211 activates the kernel 212, and the kernel 212 activates a boot program from the native programs 213. The Java® program 214 is activated by the boot program, and subsequently functions of the multi function peripheral 100 are provided by the native programs 213 and the Java® program 214 cooperating. Activation control for each module is performed in a predetermined order in this way, and activation processing of a subsequent module is executed when activation of the preceding module completes.

Figure 3B:
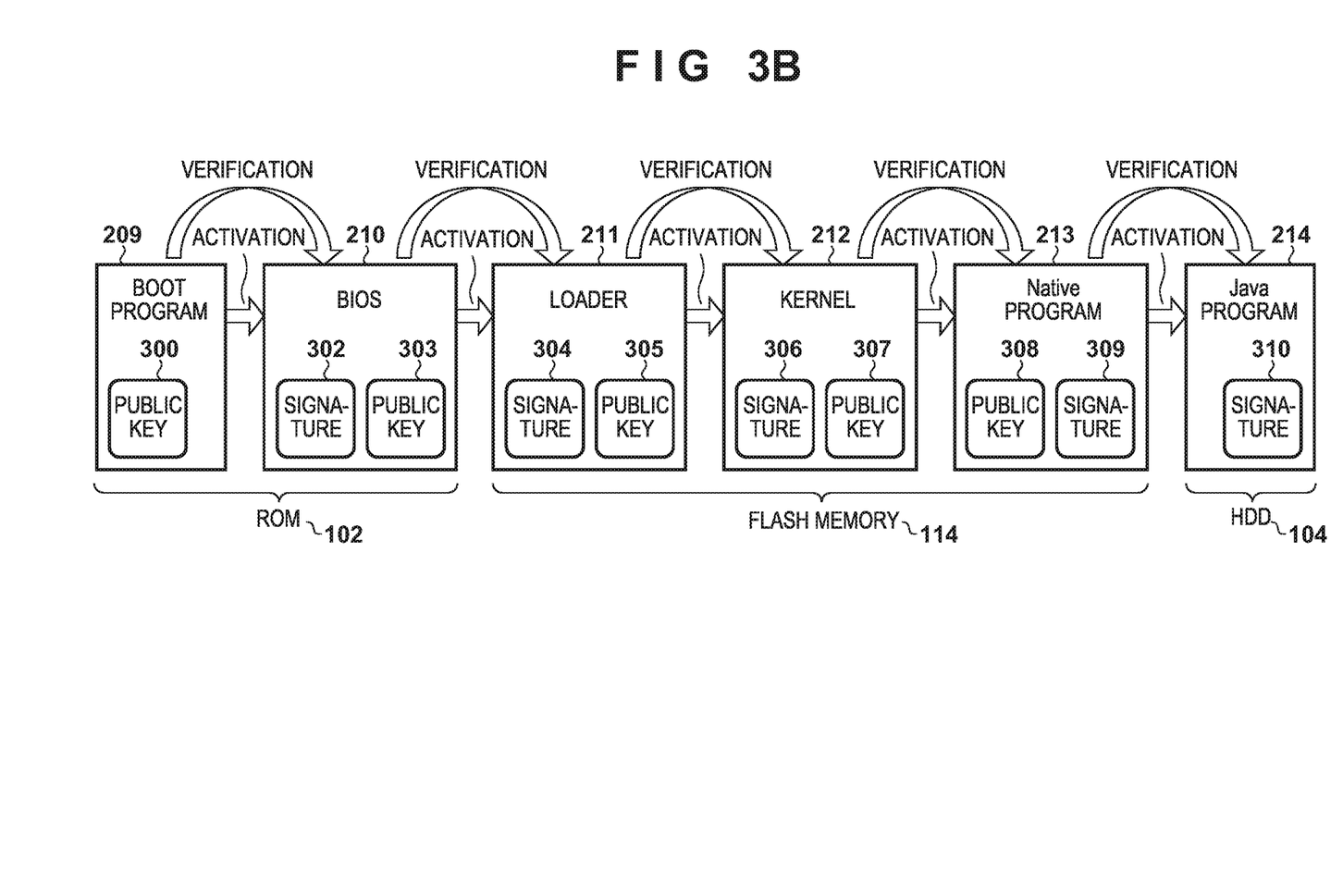

FIG. 3B illustrates an order in which the multi function peripheral 100 is activated, while performing alteration detection. As shown in the figure, activation is performed while performing alteration detection in the order of the boot program 209, then the BIOS 210, the loader 211, the kernel 212, the native programs 213, and the Java® program 214. Detecting alteration of a module to be activated is performed by the module activated immediately prior. For example, alteration detection of the BIOS 210 is performed by the boot program 209. In addition, FIG. 3B represents storage locations for each program, digital signatures (hereinafter referred to as signatures), and storage locations for public keys (verification information) for verifying signatures.

Below it is assumed that the boot program 209 and the BIOS 210 are stored in the ROM 102, and the loader 211, the kernel 212, and the native programs (first program) 213 are stored in the flash memory 114. Furthermore, it is assumed that the Java® program 214 (second program) is stored in the HDD 104.

A BIOS signature verification public key 300 is stored in the boot program 209, and a BIOS signature 302 and a loader verification public key 303 are stored in the BIOS 210. A loader signature 304 and a kernel verification public key 305 are stored in the loader 211. In addition, a kernel signature 306 and a native program verification public key 307 are stored in the kernel 212, and a native program signature 309 and a Java® program verification public key 308 are stored in the native programs 213. Furthermore, a Java® program signature 310 is stored in the Java® program 214. It is desirable that these public keys and signatures are assigned in advance to programs before factory shipping of the multi function peripheral 100. In the multi function peripheral 100 according to the present embodiment, the respective detection units for reference numerals 201, 202, and 204 to 206 perform alteration detection by verifying a respective program (respective module) that is to be activated next, and activating the next program if there is no problem.

<Processing Procedure>

Figure 4:
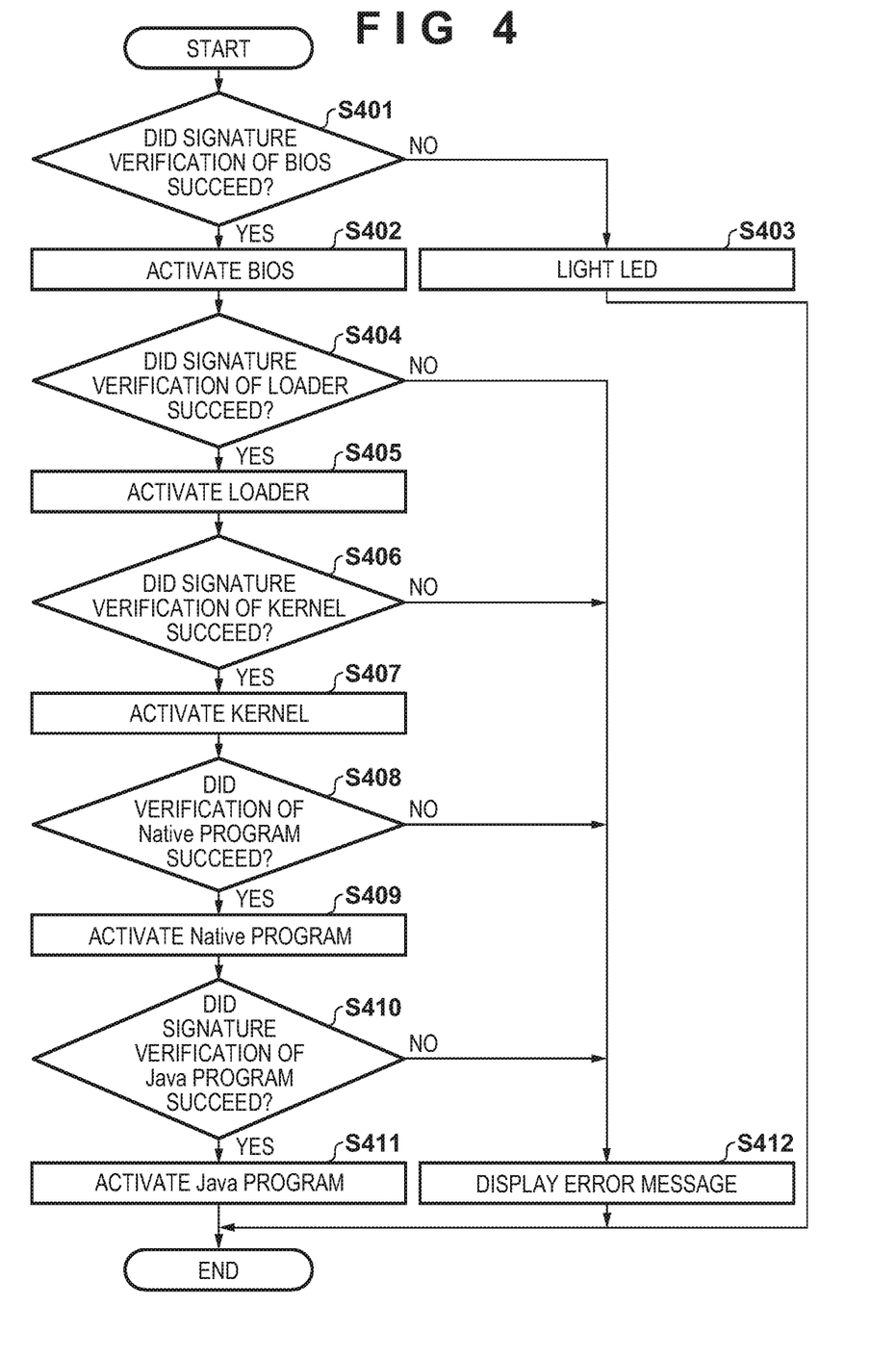
FIG. 4 is a flowchart for describing a processing procedure according to the embodiment.

Next, with reference to FIG. 4, description is given for a procedure for processing at a time of activation of the multi function peripheral 100 according to the present embodiment. When the power source for the multi function peripheral 100 is inputted, the boot program 209 is read from the ROM 102 into the RAM 116, and it is executed by the CPU 115.

In step S401, the BIOS alteration detection unit 201 included in the boot program 209 performs a signature verification for the BIOS, and determines whether the signature verification succeeded. Specifically, the BIOS alteration detection unit 201 reads the BIOS 210, the loader verification public key 303, and the BIOS signature 302 from the flash memory 114 into the RAM 116. Furthermore, the BIOS alteration detection unit 201 uses the BIOS verification public key 300 to perform a verification of the BIOS signature 302 and determine whether the verification succeeded. When verification of the signature fails, the processing proceeds to step S403, and the BIOS alteration detection unit 201 causes the LED 117 to light and ends the processing. Meanwhile, if verification of the signature succeeds, the BIOS alteration detection unit 201 applies a current to the CPU 101, and the processing of the boot program ends. Subsequently, the flowchart transitions to processing for step S402 and thereafter which is executed by the CPU 101.

When the current is applied, in step S402, the CPU 101 reads the BIOS 210 and the loader verification public key 303 from the flash memory 114 into the RAM 103, and activates the BIOS 210. Subsequent processing is all described as processing that is processed by the CPU 101.

When the BIOS 210 is activated, the processing transitions to step S404. In step S404, the BIOS 210 executes various initialization processing, and the loader alteration detection unit 202 included in the BIOS 210 reads the loader 211, the kernel verification public key 305, and the loader signature 304 from the flash memory 114 into the RAM 103. Furthermore, the loader alteration detection unit 202 uses the loader verification public key 305 to perform a verification of the loader signature 304 and determine whether the verification succeeded. When verification of the signature fails, the processing advances to step S412, and the loader alteration detection unit 202 displays an error message on the operation panel 110 and the processing ends. Meanwhile, when verification of the signature succeeds, the loader alteration detection unit 204 ends processing, advances to step S405, and the BIOS 210 activates the loader 211 that was read into the RAM 103.

When the loader 211 is activated, the processing transitions to step S406. In step S406, the loader 211 executes various initialization processing, and the kernel alteration detection unit 204 included in the loader 211 reads the kernel 212, the native program verification public key 307, and the kernel signature 306 from the flash memory 114 into the RAM 103. Furthermore, in step S406, the kernel alteration detection unit 204 uses the kernel verification public key 305 to perform a verification of the kernel signature 306 and determine whether the verification succeeded. When verification of the signature fails, the processing advances to step S412, and the kernel alteration detection unit 204 displays an error message on the operation panel 110 and the processing ends. Meanwhile, when verification of the signature succeeds, the kernel alteration detection unit 204 ends processing, advances to step S407, and the loader 211 activates the kernel 212 that was read into the RAM 103.

When the kernel 212 is activated, the processing transitions to step S408. In step S408, the kernel 212 executes various initialization processing. Furthermore, the program alteration detection unit 205 included in the kernel 212 reads the native programs 213, the Java® program verification public key 308, and the native program signature 309 from the flash memory 114 into the RAM 103. In step S408, the program alteration detection unit 205 uses the native program verification public key 307 to perform a verification of the native program signature 309 and determine whether the verification succeeded. When verification of the signature fails, in step S412 the program alteration detection unit 205 displays an error message on the operation panel 110 and the processing ends. Meanwhile, when verification of the signature succeeds, the program alteration detection unit 205 ends processing and activates the native programs 213 in step S409.

When, from out of the native programs 213, the Java® program alteration detection unit 206 which is for executing processing for alteration detection is activated, the processing transitions to step S410. In step S410, the Java® program alteration detection unit 206 reads the Java® program 214 and the Java® program signature 310 from the HDD 104 into the RAM 103. In step S410, the Java® program alteration detection unit 206 uses the Java® program verification public key 308 to perform a verification of the Java® program signature 310, and determine whether the verification succeeded. When verification of the signature fails, the processing advances to step S412, and the Java® program alteration detection unit 206 displays an error message on the operation panel 110 and the processing ends. Meanwhile, when verification of the signature succeeds, the Java® program alteration detection unit 206 ends processing and, the native programs 213 activates the Java® program 214 in step S411.

As described above, the information processing apparatus according to the present embodiment sequentially activates a plurality of modules after the activation of a boot program. Each module uses verification information for verifying a signature of the module to be activated next to detect alteration of the module that is next to be activated, and activates the module to be activated next when verification of the signature succeeds. Furthermore, each module holds in advance verification information and its own signature. By this, the present information processing apparatus, even without having a TPM configuration, can detect an alteration regardless of which of the BIOS 210, the loader 211, the kernel 212, the native programs 213, or the Java® program 214 have been altered. In addition, because alteration detection is performed immediately prior to activating each software program and activation is immediately stopped if alteration is found, it is possible to guarantee that the multi function peripheral 100 only operates in a secure state at all times, and an altered software program does not operate even for an instant. In addition, in accordance with another aspect, the present information processing apparatus can provide a more robust mechanism for detecting an alteration in a system.

Second Embodiment

Below, description will be given for a second embodiment of the present invention. In the first embodiment described above, there is a configuration where the HDD 104 stores Java® programs. Because the HDD 104 is a region that is used for data storage, it can be read from or written to, and has the highest possibility of being altered. In the first embodiment described above, there is a problem that availability decreases because activation of the multi function peripheral 100 is stopped when there is alteration. Accordingly, in the present embodiment, description is given regarding a method with which availability does not decrease even if a Java® program stored in the HDD 104 is altered.

<Activation Procedure>

Figure 3C:
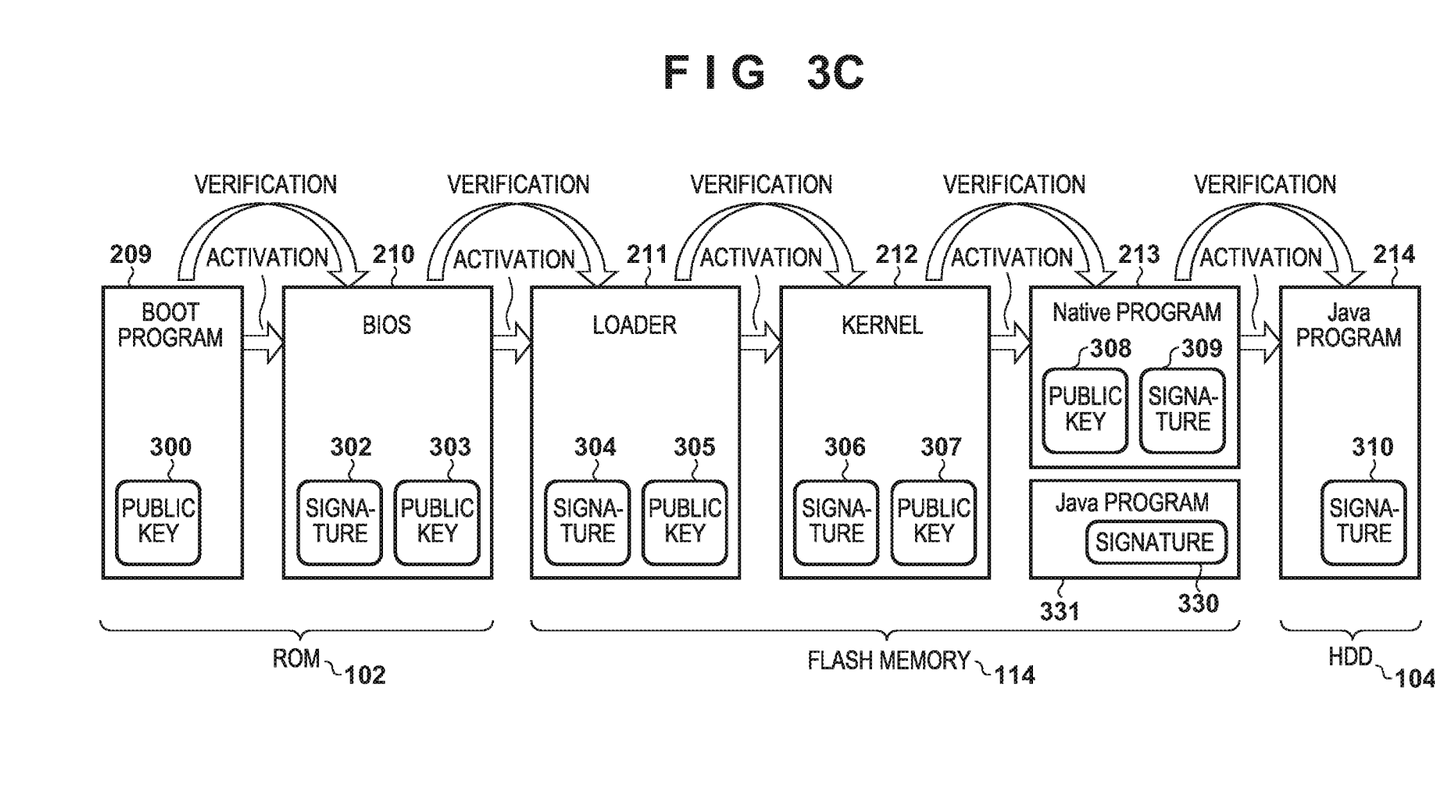

Next, with reference to FIG. 3C, description is given for each program, signature, storage location for a public key, and an activation order in the embodiment. As illustrated by FIG. 3C, the procedure for activating each module is similar to FIG. 3B which is described in the first embodiment described above. However, in the present embodiment, unlike in the first embodiment described above, a Java® program is also stored in the flash memory 114 in addition to in the HDD 104. Furthermore, a signature 330 that is the same as the signature 310 of the Java® program 214 is stored in the flash memory 114 together with a Java® program 331. As long as the signature 330 is not altered, it is the same as the signature 310 stored in the HDD 104.

<Processing Procedure>

Figure 5:
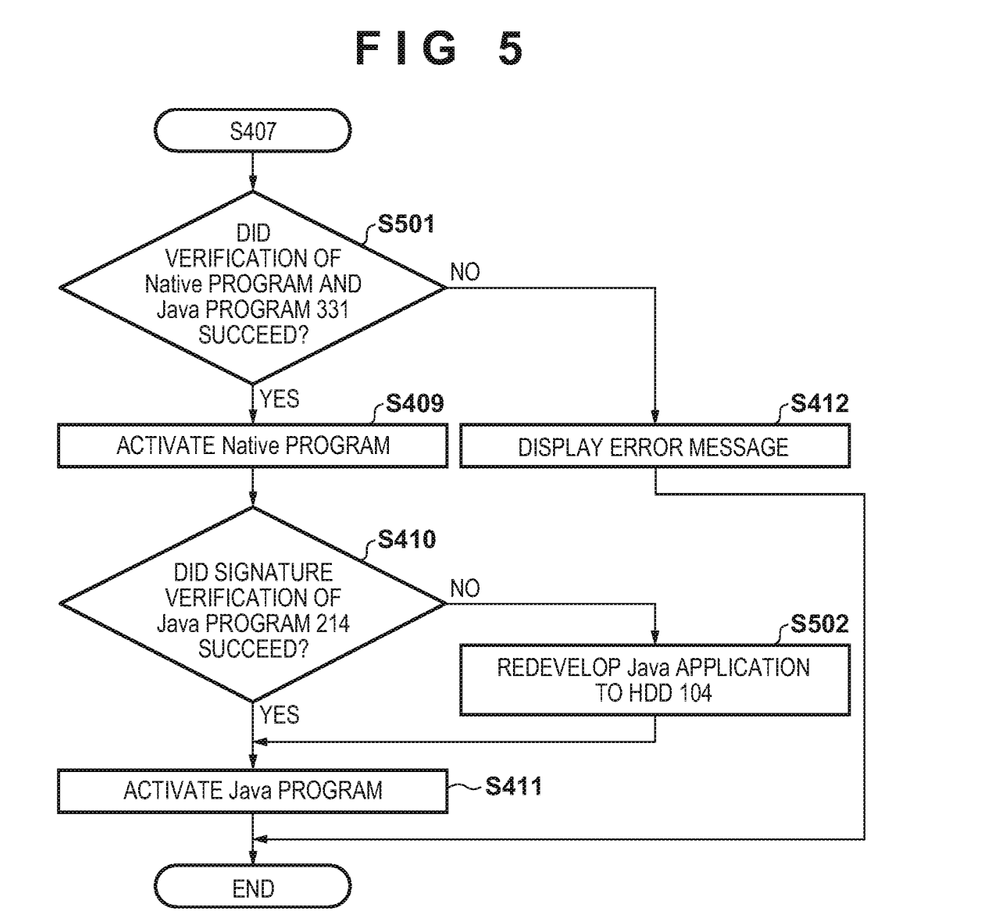
FIG. 5 is a flowchart for describing a processing procedure according to the embodiment.

Next, with reference to FIG. 5, description is given for a procedure for processing at a time of activation of the multi function peripheral 100 according to the present embodiment. Because step S401 through step S407, step S409, step S410, and step S412 have processing similar to that in the first embodiment described above, description thereof is omitted.

In step S407, when the kernel 212 is activated, various initialization processing is executed, and the processing proceeds to step S501. Furthermore, the program alteration detection unit 205 included in the kernel 212 reads the native programs 213, and the Java® program 214 from the flash memory 114 into the RAM 103. Furthermore, the program alteration detection unit 205 reads the Java® program verification public key 308, the native program signature 309, and the signature 330 of the Java® program 331 from the flash memory 114 into the RAM 103.

Subsequently, in step S501, the program alteration detection unit 205 uses the native program verification public key 307 to perform a verification of the signature 309 of the native programs 213. Furthermore, the program alteration detection unit 205 uses the Java® program verification public key 308 to perform a verification of the signature 330 of the Java® program 331 and determine whether both signature verifications succeeded. When both signature verifications succeed, the processing transitions to step S409. Meanwhile, when either signature verification fails, the processing transitions to step S412.

When the processing of step S409 ends and it is determined in step S410 that the signature verification of the Java® program 214 failed, the processing transitions to step S502. In step S502, the Java® program alteration detection unit 206 deletes the Java® program 214 from the HDD 104, and executes redeployment processing for writing the Java® program 331 stored in the flash memory 114 and its signature 330 to the HDD 104. When the redeployment processing ends, the Java® program alteration detection unit 206 ends processing, the processing advances to step S411, and the Java® program 214 is activated.

As described above, by virtue of the present embodiment, Java® programs are held in the flash memory 114 in addition to the HDD 104. Because of this, even if a Java® program of the HDD 104 which has a high possibility of being altered is altered, it is possible to avoid a decrease in availability because the alteration can be restored by the Java® program 331 which is in the flash memory 114 being redeployed.

Third Embodiment

Figure 3D:
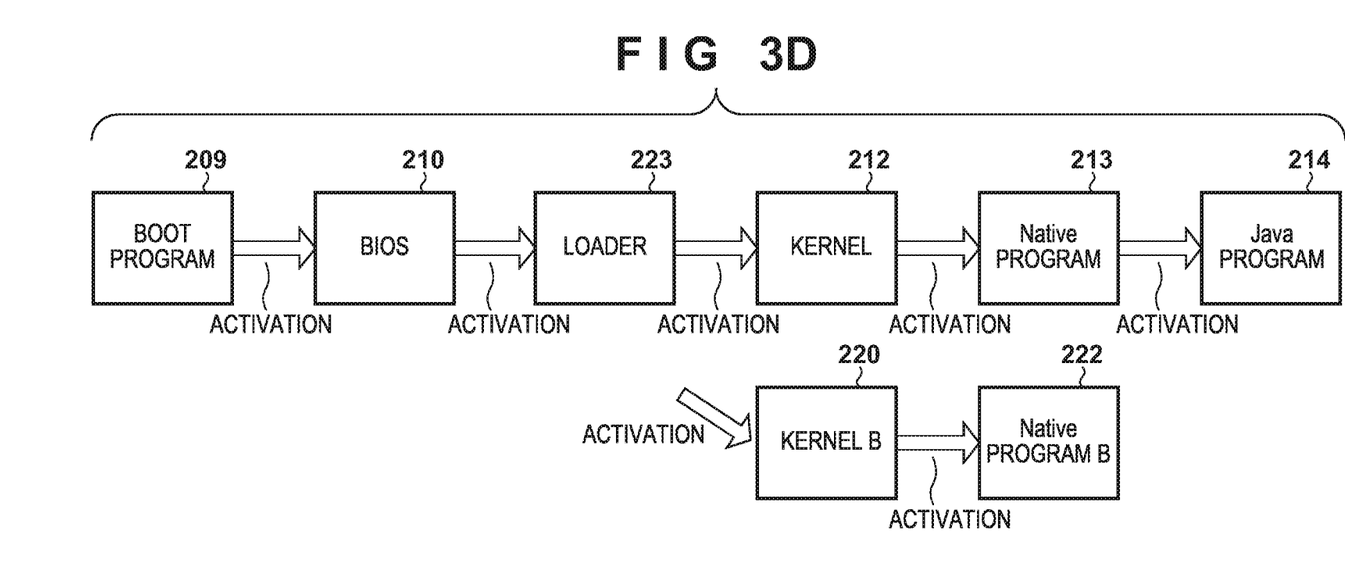

Below, explanation will be given for a third embodiment of the present invention. As illustrated by FIG. 3D, there is a case where a configuration taken is one where the multi function peripheral 100 holds a plurality of kernels and programs, and the kernel and programs to activate are replaced by the loader. With such a configuration, in the case of an attempt to be activate a kernel B 220 which is not the kernel 212 under the configuration of the first or second embodiments described above, there is a problem that because there is no signature for the kernel B 220 it will be detected as altered despite not being altered, and will not activate. Accordingly, in the present embodiment, description is given regarding a method for performing alteration detection and activation even with a configuration where a different kernel and a different program are held.

<Software Configuration>

Figure 2B:
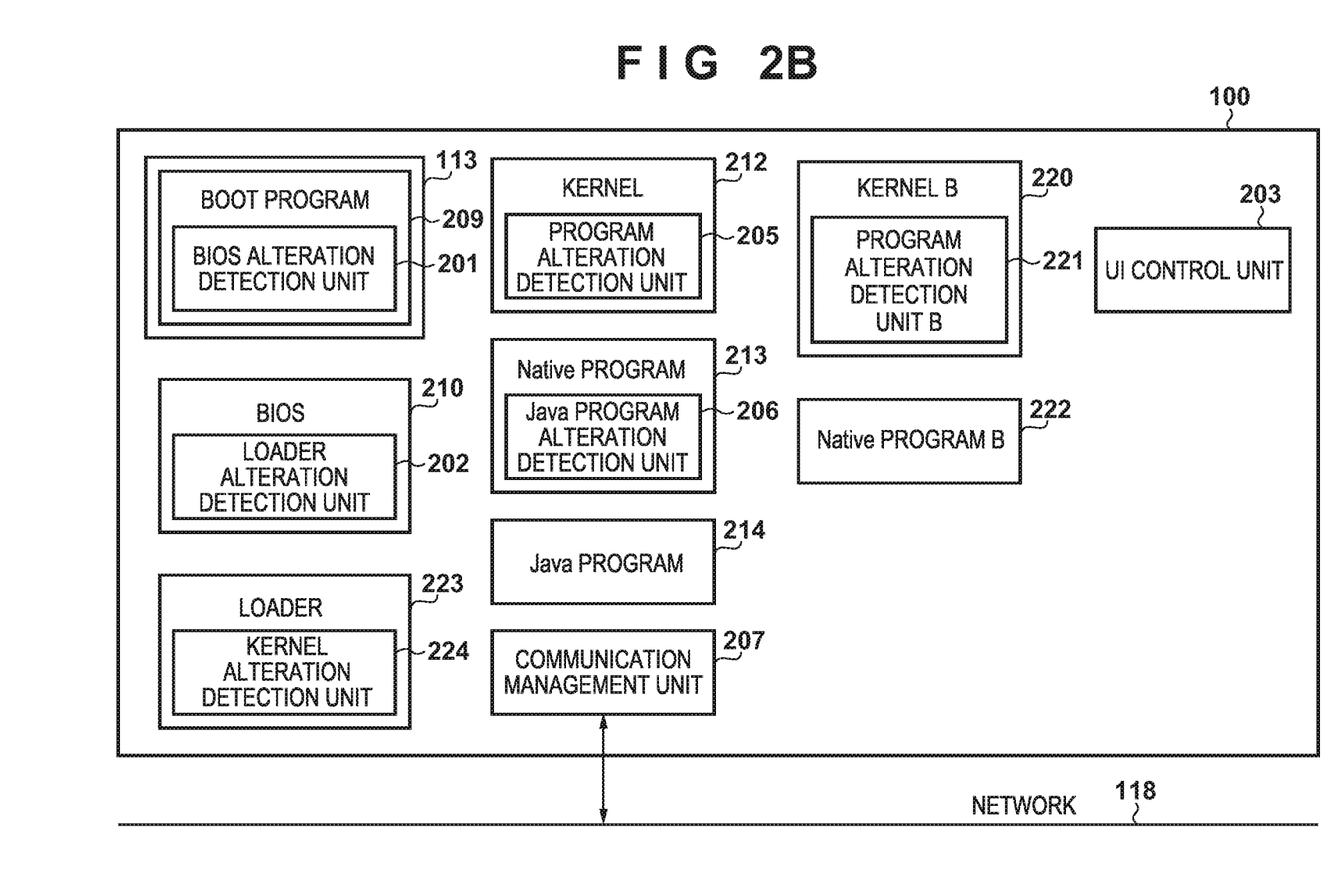

Firstly, with reference to FIG. 2B, description is given for an example of a configuration of software modules held by the multi function peripheral 100 according to the present embodiment. Because reference numerals 201 to 214 are the same as in FIG. 2A, description thereof is omitted.

The loader 223 is a program executed by the CPU 101 after processing for the BIOS 210 completes, and, in addition to executing processing relating to activation, has a kernel alteration detection unit 224 for detecting alteration of the kernel. The loader 223 replaces the kernel to activate in accordance with a user input via the operation panel 110.

The kernel B 220 is a program executed by the CPU 101 that differs to the kernel 212, executes processing related to activation, and also has a program alteration detection unit 221 for performing alteration detection of a native program B 222. The native program B 222 is a program that is executed by the CPU 101, and provides an update function for the multi function peripheral 100. It is called by the kernel B 220, and provides a function for updating the kernel 212, the native programs 213, or the Java® program 214. Note that the native program B 222 is not limited to an update function, and may be a program that provides another function.

<Activation Procedure>

Figure 3E:
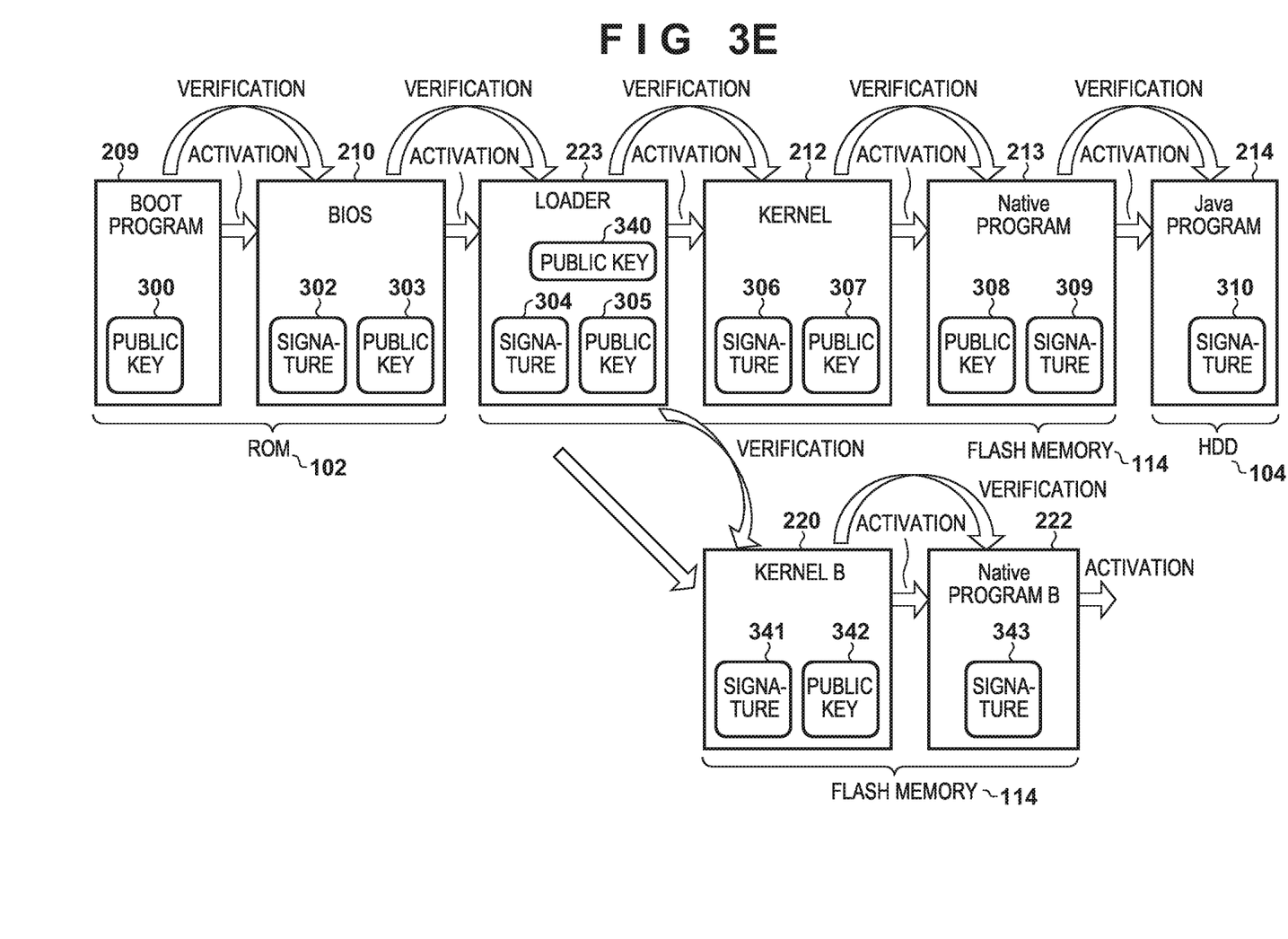

Next, with reference to FIG. 3E, description is given for a flow of processing in which a target for alteration detection may be replaced and activated in accordance with whether the kernel to be activated by the loader 223 is the kernel 212 or the kernel B 220.

It is assumed that the loader 223 includes a signature 304 of the loader 223, the public key 305 for verification of the kernel 212, and a public key 340 for verification of the kernel B 220. In addition, a signature 341 for the kernel B and a public key 342 for verification of the native program B are included in the kernel B 220, and a signature 343 for the native program B is included in the native program B 222. It is desirable that these public keys and signatures are assigned in advance to programs before factory shipping of the multi function peripheral 100. In this way, the loader 223 includes respective public keys (verification information) for a plurality of kernels that can be activated next.

<Processing Procedure>

Figure 6:
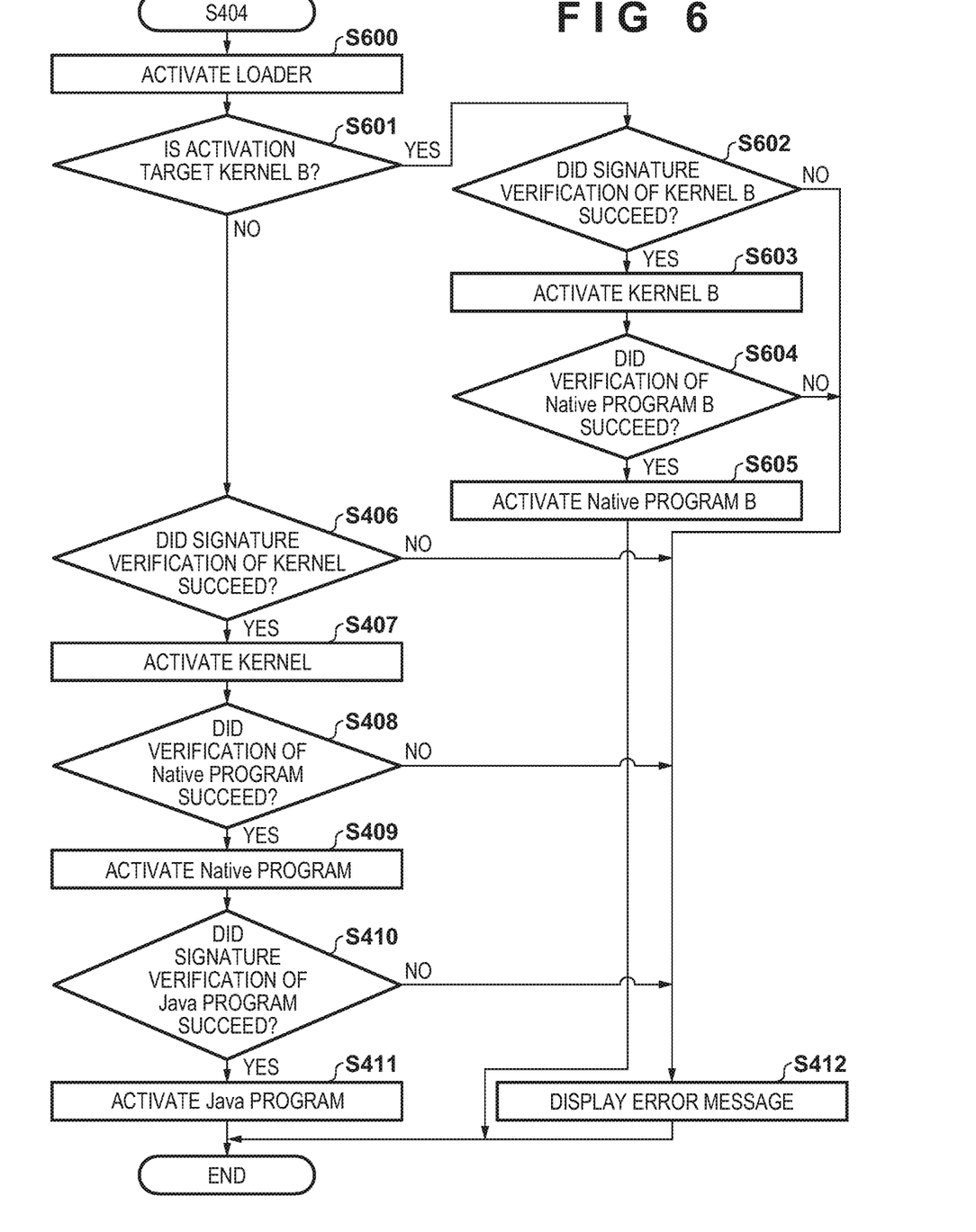
FIG. 6 is a flowchart for describing a processing procedure according to the embodiment.

Next, with reference to FIG. 6, description is given for a procedure for processing at a time of activation of the multi function peripheral 100 according to the present embodiment. Because the processing of step S401 through step S404 and step S406 through step S412 is similar to that in FIG. 4, description thereof is omitted.

In step S600, when the loader 223 is activated, various initialization processing is performed. Next, in step S601, the loader 223 determines whether the kernel B 220 has been selected as an activation target via the operation panel 110. If the kernel B 220 has not been selected as an activation target, the processing of step S406 is transitioned to. Meanwhile, when the kernel B 220 is selected, the kernel alteration detection unit 224 included in the loader 223 reads the kernel B 220, the public key 342 for verification of the native program B, and the signature 341 of the kernel B from the flash memory 114 into the RAM 103. In step S602, the kernel alteration detection unit 224 uses the public key 342 for verification of the kernel B to perform a verification of the signature 341 of the kernel B and determine whether the verification succeeded. If verification of the signature fails, the processing transitions to step S412. Meanwhile, when verification of the signature succeeds, the kernel alteration detection unit 221 ends processing, and, in step S603, the loader 223 activates the kernel B 220 that was read into the RAM 103.

When the kernel B 220 is activated, various initialization processing is performed, and the program alteration detection unit 221 included in the kernel B 220 reads the native program B 222 and the signature 343 for the native program B from the flash memory 114 into the RAM 103. In step S604, the program alteration detection unit 221 uses the public key 342 for verification of the native program B to perform a verification of the signature 343 of the native program B and determine whether the verification succeeded. If verification of the signature fails, the processing transitions to step S412. Meanwhile, when verification of the signature succeeds, the program alteration detection unit 221 ends processing and activates the native program B 222 in step S605. Upon activating the native program B 222, provides a user with the update function.

As described above, by virtue of the present embodiment, even with a configuration where a plurality of kernels and a plurality of programs are held, it is possible to perform activation after performing alteration detection for these, and it is possible to achieve an effect similar to that of the first and second embodiments described above.

<Variation>

The present invention is not limited to the embodiments described above, and various variations are possible. In the first through third embodiments described above, the public keys were described as all being different to one another, but they may be the same. In addition, description was given with the ROM 102, the flash memory 114, and the HDD 104 as the storage location for respective programs, but this does not limit the storage location, and the storage location may be a different storage medium. In addition, the storage location of a program does not need to be a described location, and configuration may be taken to store the loader 223 in the ROM 102, for example.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201956 filed on Oct. 18, 2017, which is hereby incorporated by reference herein in its entirety.

What is claimed is:

1. A peripheral that has a printing function and is operable to sequentially activate a plurality of modules, implemented as software, after activation of a hoot program by an embedded controller of the peripheral, the peripheral comprising:

at least one processor; and at least one memory coupled to the at least one processor and having stored thereon instructions which, when executed by the at least one processor, cause the at least one processor to function as a detection unit to execute a verification process which uses verification information for verifying a signature of a module to be activated next to detect alteration of the module to be activated next, and an activation unit to execute an activation process which activates the module to be activated next in a case where verification of the signature by the detection unit succeeds, wherein the plurality of modules include at least a Basic Input/Output System (BIOS), a loader, a first kernel, and a first program, and the plurality of modules are activated in the following order: the BIOS, the loader, the first kernel, and the first program, wherein each module holds in advance the verification information and its own signature, and wherein peripheral holds at least a second kernel in addition to the first kernel as a spare, and executes, in a case where the second kernel is activated as a boot target, the verification process by the detection unit and the activation process by the activation unit.

2. The peripheral according to claim 1, wherein the embedded controller for executing the boot program: comprises the detection unit and the activation unit, and holds in advance the verification information.

3. The peripheral according to claim 1, wherein the activation unit stops activation of the peripheral in a case where verification of a signature by the detection unit fails.

4. The peripheral according to claim 1, wherein the boot program and the BIOS are stored in a Read-Only Memory (ROM), the loader, the first kernel, and the first program are stored in a flash memory, and a second program to be activated next after the first program is stored in a Hard Disk Drive (HDD).

5. The peripheral according to claim 4, wherein the flash memory also stores the second program, and in a case where verification of a signature by the detection unit for the second program stored in the HDD fails, the activation unit of a module that activates the second program redeploys the second program stored in the flash memory to the HDD, and activates the second program.

6. The peripheral according to claim 1, wherein the activation unit replaces and activates a module to be activated next in accordance with a user input, each module holds in advance verification information for each of a plurality of modules that can be activated next, and its own signature.

7. The peripheral according to claim 1, further comprising a main controller that controls each module, wherein the embedded controller has a memory and a processor separate from the main controller.

8. A method of controlling a peripheral that has a printing function and is operable to sequentially activate a plurality of modules, implemented as software, after activation of a boot program by an embedded controller of the peripheral, wherein each module of the plurality of modules can perform:

a verification process using verification information for verifying a signature of a module to be activated next to detect alteration of the module to be activated next, and an activation process for activating the module to be activated next when verification of the signature succeeds, and wherein the plurality of modules includes at least a Basic Input/Output System (BIOS), a loader, a first kernel, and a first program, and the plurality of modules are activated in the following order: the (BIOS), the loader, the first kernel, and the first program, wherein each module holds in advance the verification information and its own signature, and wherein the peripheral holds at least a second kernel in addition to the first kernel as a spare, and executes, in a case where the second kernel is activated as a boot target, the verification process for verifying and the activation process for activating.

9. A non-transitory computer-readable storage medium storing a computer program for causing a computer to execute each step of a method of controlling a peripheral that has a printing function and is operable to sequentially activate a plurality of modules, implemented as software, after activation of a boot program by an embedded controller of the peripheral, wherein each module of the plurality of modules can perform:

a verification process using verification information for verifying a signature of a module to be activated next to detect alteration of the module to be activated next, and an activation process for activating the module to be activated next when verification of the signature succeeds, and wherein the plurality of modules includes at least a Basic Input/Output System (BIOS), a loader, a first kernel, and a first program, and the plurality of modules are activated in the following order: the BIOS, the loader, the first kernel, and the first program, wherein each module holds in advance the verification information and its own signature, and wherein the peripheral holds at least a second kernel in addition to the first kernel as a spare, and executes, in a case where the second kernel is activated as a boot target, the verification process for verifying and the activation process for activating.

* * * * *